(12) United States Patent
Handl et al.

(10) Patent No.: US 6,216,666 B1
(45) Date of Patent: Apr. 17, 2001

(54) INTAKE PASSAGE ARRANGEMENT IN AN INTERNAL COMBUSTION ENGINE

(75) Inventors: Thomas Handl, Graz; Ralf Marquard, Lassnitzhöhe, both of (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 09/302,511

(22) Filed: Apr. 30, 1999

(30) Foreign Application Priority Data

May 7, 1998 (AT) .................................................. 298/98 U

(51) Int. Cl.$^7$ .............................. F02M 35/10; F02D 9/10
(52) U.S. Cl. ............... 123/308; 123/184.55; 123/184.61; 123/336; 123/337
(58) Field of Search .................... 123/308, 306, 123/193.3, 336, 337, 184.55, 184.52, 184.59, 184.61

(56) References Cited

U.S. PATENT DOCUMENTS

| 5,211,139 | * | 5/1993 | Houle et al. | 123/184.55 |
| 5,715,782 | * | 2/1998 | Elder | 123/184.61 |
| 5,875,758 | * | 3/1999 | Fujita | 123/336 |
| 5,996,549 | * | 12/1999 | Mayer et al. | 123/306 |
| 6,016,780 | * | 1/2000 | Fischer | 123/184.55 |

FOREIGN PATENT DOCUMENTS

| 402326 | 6/1989 | (AT) . |
| 3619550 | 12/1986 | (DE) . |
| 3942637 | 6/1990 | (DE) . |
| 0173014 | 3/1986 | (EP) . |
| 0258207 | 7/1987 | (EP) . |

OTHER PUBLICATIONS

Abstract entitled "Swirl Adjusting Device of Internal Combustion Engine" from JP 57–88217, dated Jun. 2, 1982, Yanmar Diesel K.K.
Abstract entitled "Intake Structure For Internal Combustion Engine" from JP 54–57011, dated Aug. 5, 1979, Kubota Tekko K.K.
Abstract entitled "Swirl Control Device of Engine" from JP 3–134226, dated Jun. 7, 1991, Fuji Heavy Ind. Ltd.

* cited by examiner

Primary Examiner—Henry C. Yuen
Assistant Examiner—Hieu T. Vo
(74) Attorney, Agent, or Firm—Dykema Gossett PLLC

(57) ABSTRACT

In an intake passage arrangement in an internal combustion engine at least two intake ports located in a cylinder head depart from a common intake flow path. In the area where the flow path branches into the separate intake ports a swirl control device configured as a control flap is positioned, which is rotatable about a rotation axis situated at one end of the control flap. In one position the control flap opens both intake ports, whereas it blocks one intake port in another position. To ensure control of the swirl motion of the intake flow entering the combustion chamber and to permit a most simple and compact design an intermediary part carrying the control flap is essentially configured as a thin, flat frame, and preferably as a die-cast part made of aluminum.

13 Claims, 3 Drawing Sheets

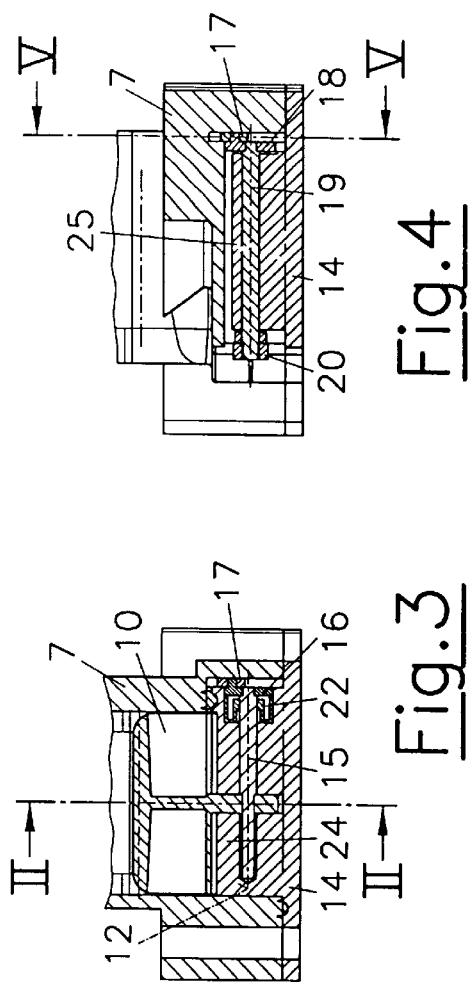
Fig.1
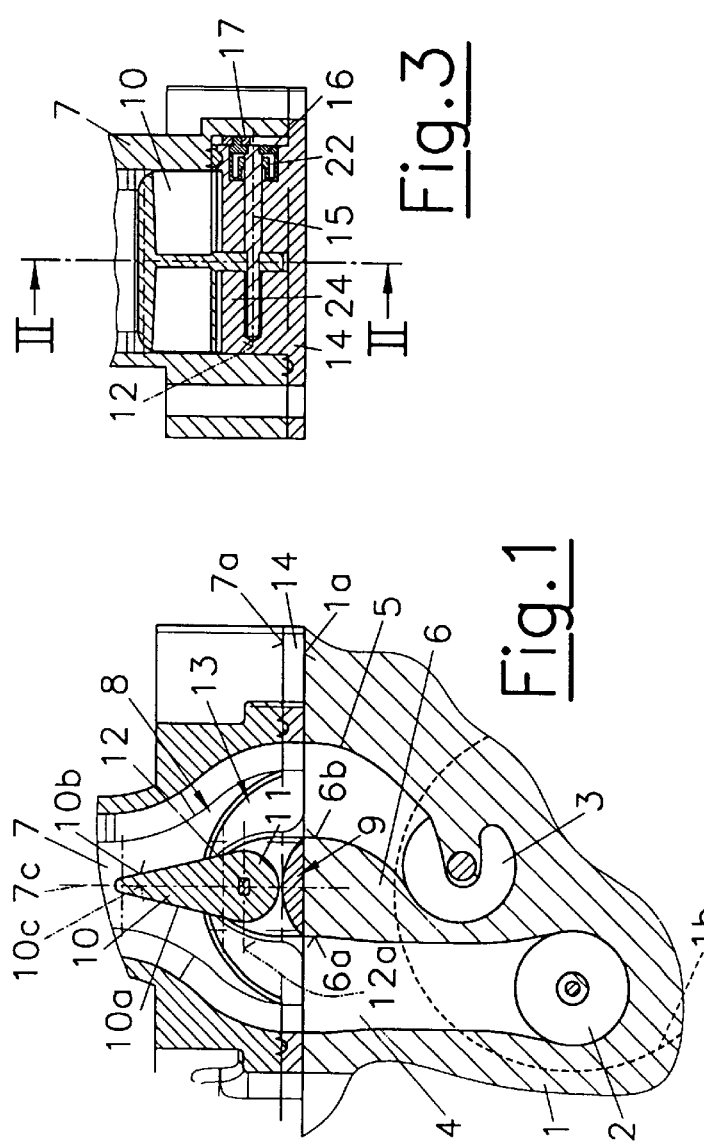
Fig.3
Fig.4
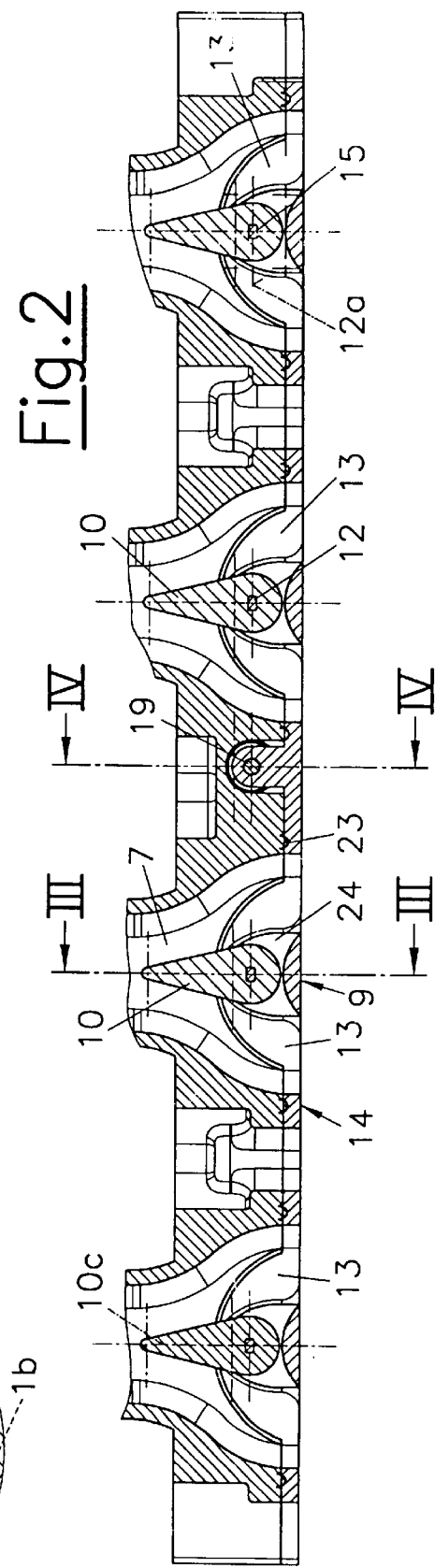
Fig.2

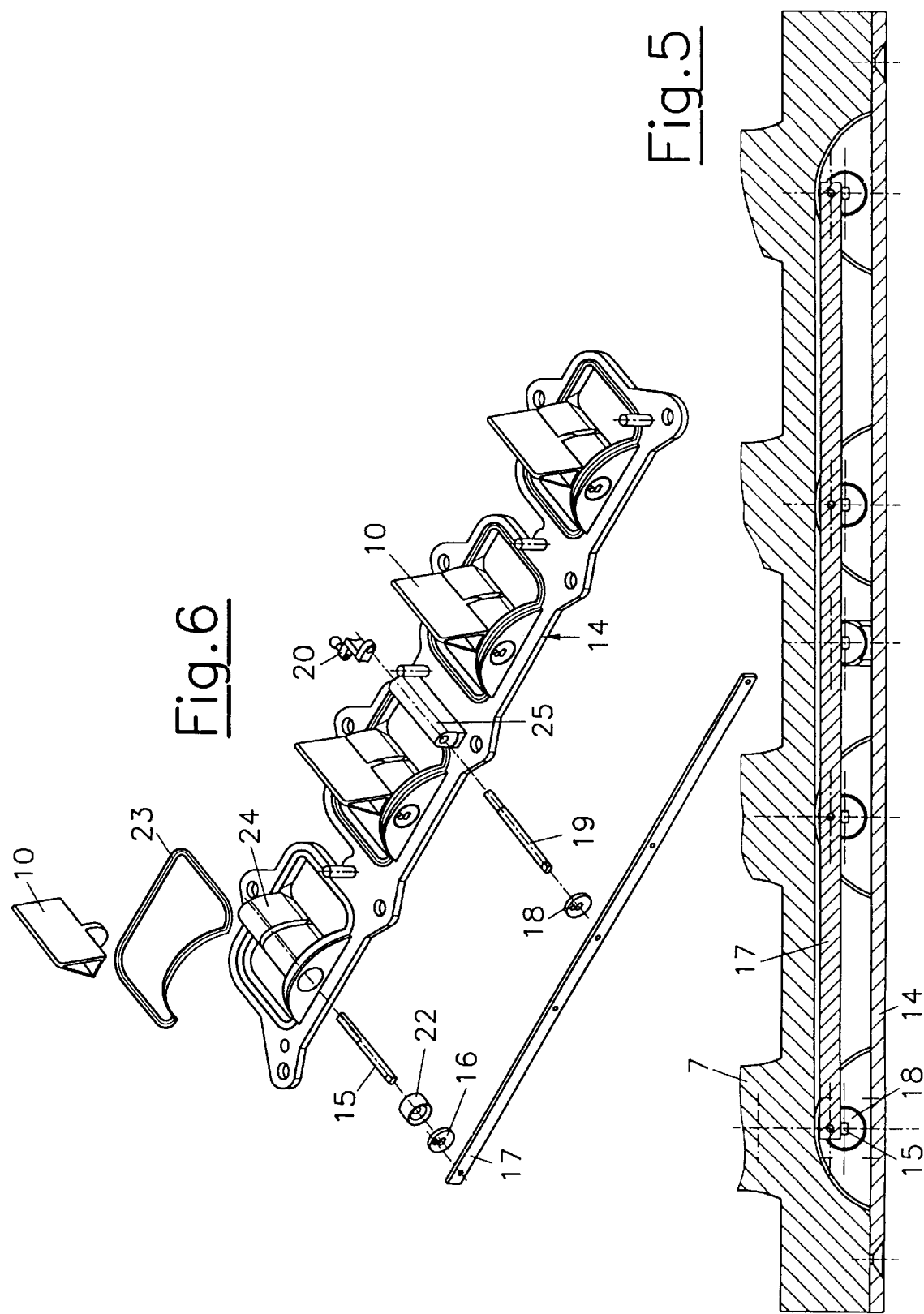

INTAKE PASSAGE ARRANGEMENT IN AN INTERNAL COMBUSTION ENGINE

BACKGROUND OF THE INVENTION

This invention relates to an intake passage arrangement in an internal combustion engine, including at least two intake ports or port sections per cylinder which are located in a cylinder head and are separated by a joint wall section, and which branch off from a common intake flow path, a control flap being positioned in a section of the intake passage in the area of the branch-off, which flap is rotatable about a rotation axis situated at one end of the control flap, the control flap opening both intake ports or port sections in one position and blocking one intake port in another position, and the part of the intake passage section carrying the control flap being configured as a separate intermediary part adjacent to the intake ports.

DESCRIPTION OF THE PRIOR ART

There are examples of cylinder heads where one of the intake valves is designed to impart a swirl to the cylinder charge. This is achieved by configuring at least one intake port as a swirl passage (spiral or tangential passage). In lean-mix, spark-ignition engines, in particular, the requirements concerning the intake flow will vary with the load or speed of the engine. Whereas no swirl motion but optimum filling will be required under conditions of full load and/or high RPM, a slight swirl is desirable at low load, which can reduce smoke emission considerably. Filling is of minor importance under low load conditions, however.

In EP 0 258 207 A2 a cylinder head for a two-valve internal combustion engine is described, where the intake passage has a partition along its length, such that two partial intake passages are formed which reunite in the valve region. In the area of the intake pipe, i.e., just before it connects to the intake passage, one of the two partial passages can be closed by means of a control flap positioned in a separate part of the intake pipe. If a swirl flow is desired for part-load operation or low RPM, the control flap is actuated to control the flow in this partial passage. The unsymmetrical flow through the uncontrolled partial passage will produce the swirl motion desired for this operating range. If, on the other hand, optimum cylinder filling is to be obtained at full load, the flap is opened completely to make available the entire passage cross-section. In this manner a low-swirl or swirl-free flow is induced. For fuel injection into the intake pipe an injector opens into the part of the intake pipe containing the control flap. This essentially cylindrical part of the intake pipe adds to the dimensions of the engine and requires further connecting elements, such as bolts or the like.

AT 402 326 B presents an intake passage arrangement with two intake ports opening side by side in the area of the intake pipe. One of these intake ports has a partition running along its length, thus forming two partial passages reuniting in the area of the intake valve. The other intake port and the partial passage of the first intake port next to it, are jointly controlled by a control flap located at the beginning of the intake pipe. In the closed position of the control flap one partial passage of the first intake port and the second intake port are closed, such that the open other partial passage will generate a swirl flow in the cylinder. In the open position of the control flap both intake ports are open. These provisions are intended to produce a similar performance as regards swirl generation and filling in multi-valve arrangements.

In DE 36 19 550 A1 a cylinder head is described in which the first intake port is configured as a swirl-generating passage and where the partitioning wall has an opening connecting the two partial passages upstream of the valve chamber. The passage which is separated from the helical intake passage by the partitioning wall, is activated to interfere with, and thus control, the generated swirl. Interference is controlled with the use of a throttle, which is located in the cylinder head in the second intake port.

A similar type of cylinder head with two intake valves and two comparatively short intake passages, one of which is configured as swirl-generating passage, is known from EP 0 173 014 A2. In that instance a bypass passage branches off from the passage that does not generate a swirl, which bypass opens into the valve chamber of the swirl-generating passage. By means of a control flap positioned in the cylinder head the flow of the non-swirl-generating passage and the bypass passage may be controlled. With this arrangement swirl control is effected by interference, in a manner similar to that described in the context of DE 36 19 550 A1 above.

Flaps that are located in the cylinder head or intake pipe require large design efforts, while maintenance in this area involves considerable efforts of assembly and disassembly.

SUMMARY OF THE INVENTION

It is an object of the invention to overcome these problems and to further develop an intake passage arrangement of the above type such that it will permit effective swirl control of the intake flow whilst offering a simple and compact design.

In the invention this object is achieved by essentially configuring the intermediary part carrying the control flap as a thin, flat frame, and preferably as a die-cast part made of aluminum. This will eliminate the need for complex design efforts concerning the structure of the cylinder head, thus allowing the frame to be retrofitted in conventional cylinder heads, if desired. The intermediary part is inserted between the intake pipe and a corresponding intake flange of the cylinder head.

In a variant of the invention featuring ease of manufacture and assembly the intermediary parts of several cylinders be connected to each other, and preferably are configured as an integral unit. In this way the number of required components may be minimized.

In order to ensure a most simple actuation of the control flaps the rotation axes of the control flaps of a plurality of cylinders are situated in one plane, and the control flaps are actuated via a lever mechanism and a vacuum capsule in dependence on the intake pressure. The system of actuating a control flap via a vacuum capsule using the intake pressure has been described in EP 0 173 014 A2, for example.

In a further variant of the invention the rotation axis of the control flap is situated in the longitudinal centre plane, and preferably just before the branch-off, such that in one extreme position of the control flap the one intake port or port section, which is preferably configured as a tangential passage, will be blocked, and in the other extreme position of the control flap the other intake port or port section, which is preferably configured as a spiral passage, will be blocked, whilst in an intermediate position of the control flap both intake ports or port sections will remain open to approximately the same degree. In this way the swirl motion in the combustion chamber may be controlled by a simple switchover between the two intake ports or port sections.

Special preference is given to a variant of the invention which proposes that the control flap have a flow profile flaring, at least partially, in flow direction, thus essentially assuming the shape of a wedge or drop, which is preferably symmetrical relative to a longitudinal plane through the flap, the flow-directing surfaces of the control flap forming a more or less continuous contour with the walls of the joint wall section when the flap is in its intermediate position. As a consequence, cylinder filling in this position will be largely loss-free. Further improvement is achieved by configuring the control flap and the section of the intake passage in which the control flap is positioned, as preferably essentially symmetrical flow dividers. The control flap of the intake passage arrangement proposed by the invention may assume any intermediate position desired, and thus effect a continuously variable switchover between tangential and spiral passage and produce suitable combinations of tangential and spiral flows.

BRIEF DESCRIPTION OF THE DRAWINGS

The invention will now be further described with reference to the accompanying drawings, in which FIG. 1 is a sectional view of an intake passage arrangement in accordance with the invention;

FIG. 2 is a sectional view of an intake passage arrangement for a plurality of cylinders along line II—II in FIG. 3;

FIG. 3 is a view of a section of the intake passage as shown in FIG. 2, along line III—III in FIG. 2;

FIG. 4 is a view of a section of the intake passage as shown in FIG. 2, along line IV—IV in FIG. 2;

FIG. 5 is a view of a section of the intake passage including the actuating mechanism for the control flap, along line V—V in FIG. 4;

FIG. 6 is an exploded view of the intermediary part;

DESCRIPTION OF PREFERRED EMBODIMENTS

Figure 7:
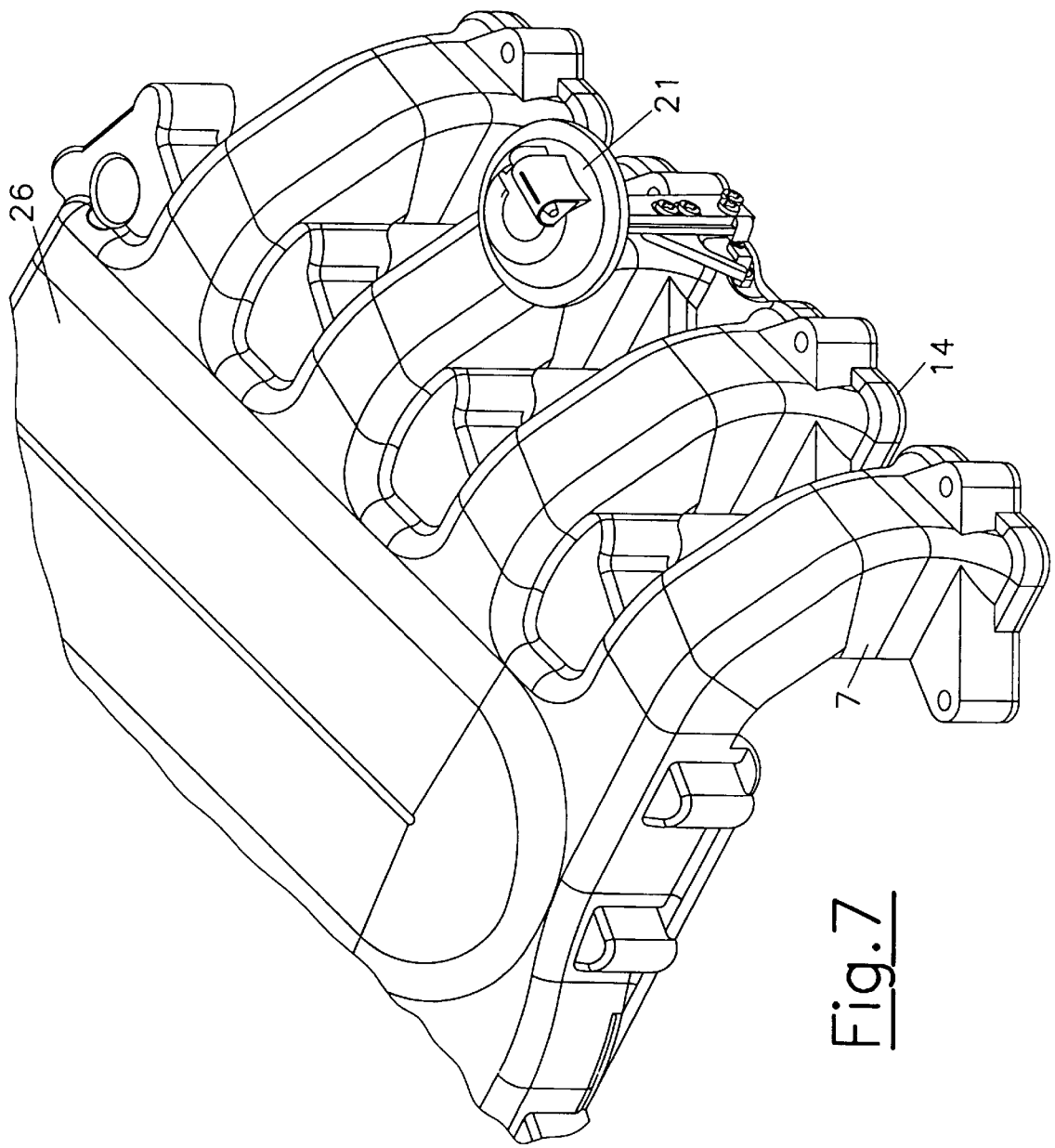
FIG. 7 is an oblique view of an intake passage arrangement in accordance with the invention.

An internal combustion engine has two intake valves 2, 3 per cylinder 1b, which are located in a cylinder head 1. Each intake valve 2, 3 is provided with an intake port 4, 5, one of which intake ports, i.e., 4, is configured as tangential passage, and the other one, i.e., 5, is configured as spiral passage. The two intake ports 4, 5 are divided by a joint wall section 6 and depart from a common intake flow path 7. They are situated on different sides of the extended longitudinal centre plane 7c of the intake flow path 7. At the end of the common intake flow path 7 there is provided an intake passage section 8 with a branch-off 9.

In the area of the branch-off 9 a swirl control device configured as control flap 10 is provided, which is held in a part 13 of the intake passage section 8 so as to be rotatable about a rotation axis 12 situated at one end 11 of the control flap 10. The part 13 is configured as a separate intermediary 14 connecting to the intake ports 4, 5, which is inserted between a flange 7a of the intake flow path 7 constituted by an intake pipe, and a corresponding intake flange 1a of the cylinder head 1. The intermediary part 14 is essentially configured as a thin, flat frame and may be supplied as a die-casting made of aluminum, for example.

In the variant shown in FIG. 2 a single intermediary 14 includes the parts 13 for a plurality of cylinders 1b. As is seen in FIGS. 1 and 2, the control flap 10 has a flow profile flaring in flow direction, thus assuming essentially the shape of a wedge or drop. The flow-directing surfaces 10a, 10b of the control flap 10 form a more or less continuous contour with the walls 6a, 6b of the joint wall section 6 of the intake ports 4, 5 and are symmetrical relative to a longitudinal plane 10c of the control flap 10, which plane 10c contains the rotation axis 12. As a consequence, the control flap 10 exhibits minimum flow resistance in its intermediate position shown in FIGS. 1 and 2. In the intermediate position the longitudinal plane 10c of the valve 10 is situated along the longitudinal centre plane 7c of the intake flow path 7.

As is seen in FIGS. 3 to 6, each control flap 10 is connected via a hinge pin 15 held in the intermediary part 14 and an intermediate disk 16 acting as a lever, to an actuating rod 17, which is operated via an intermediate disk 18 by an operating pin 19 held in the intermediate part 14. To the operating pin 19 is attached a lever 20, which is actuated by a vacuum capsule 21 (FIG. 7) in dependence on the intake pressure in the intake flow path 7. Reference number 22 refers to a sealing element of the hinge pin 15, whilst 23 refers to sealing elements between the intake flow path 7 and the intermediary part 14. Hinge pins 15 and operating pin 19 are borne by special projections 24, 25 provided on the intermediary part 14.

In the embodiment of the invention shown in FIG. 7 the intake flow paths 7 are constituted by an intake manifold 26 for a multicylinder internal combustion engine. In this variant every four cylinders are provided with an intermediary part 14 configured as an integral unit, the four control flaps 10 of each intermediary part 14 being actuated by a vacuum capsule 21 in dependence on the intake pressure.

We claim:

1. An internal combustion engine which comprises:
   a cylinder head defining first and second intake ports for a cylinder, said first and second intake ports being separated by a joint wall section,
   intake flow means forming a common intake flow path for supplying medium to said first and second intake ports; and
   an intermediary part positioned between said cylinder head and said intake flow means, said intermediary part including a thin, flat frame and a control flap rotatably mounted at one end thereof to said frame, said control flap being rotatable between a first extreme position wherein said first intake port is blocked, and a second extreme position wherein said second intake port is blocked, and to an intermediate position wherein said first and second intake ports are opened.

2. An intake passage arrangement in an internal combustion engine, comprising at least two intake ports per cylinder, which are located in a cylinder head and are separated by a joint wall section, and which branch off from a common intake flow path, a control flap being positioned in a section of an intake passage in the area of a branch-off, which flap is rotatable about a rotation axis situated at one end of the control flap, said control flap opening both intake ports in one position and blocking one intake port in another position, and a part of the intake passage section carrying the control flap being configured as a separate intermediary part adjacent to the intake ports, wherein said intermediary part is configured as a thin, flat frame.

3. An intake passage arrangement according to claim 2, wherein the intermediary part is a die-cast part made of aluminum.

4. An intake passage arrangement according to claim 2, wherein the intermediary parts of a plurality of cylinders are connected to each other.

5. An intake passage arrangement according to claim 4, wherein the intermediary part of a plurality of cylinders are configured as an integral unit.

6. An intake passage arrangement according to claim 2, wherein the rotation axes of the control flaps of a plurality of cylinders are situated in one plane, and wherein the control flaps are actuated via a lever mechanism and a vacuum capsule in dependence on an intake pressure.

7. An intake passage arrangement according to claim 1, comprising intake ports being located, at least partially, on different sides of a longitudinal centre plane of the intake flow path, wherein the rotation axis of the control flap is situated in a longitudinal centre plane, and just before the branch-off, such that in one extreme position of the control flap the one intake port will be blocked, in a second extreme position of the control flap the other intake port will be blocked, and in an intermediate position of the control flap intake ports will remain open to approximately the same degree.

8. An intake passage arrangement according to claim 7, wherein the one intake port is configured as a tangential passage and the other intake port is configured as a spiral passage.

9. An intake passage arrangement according to claim 2, wherein the control flap has flow-directing surfaces which form a more or less continuous contour with the walls of the joint wall section when the flap is in its intermediate position.

10. An intake passage arrangement according to claim 9, wherein the control flap has a flow profile flaring, at least partially, in flow direction, thus essentially assuming the shape of a wedge.

11. An intake passage arrangement according to claim 9, wherein the control flap has a flow profile flaring, at least partially, in flow direction, thus essentially assuming the shape of a drop.

12. An intake passage arrangement according to claim 9, wherein the flow profile is symmetrical relative to a longitudinal plane through the flap.

13. An intake passage arrangement according to claim 2, wherein the control flap and the section of the intake passage in which the control flap is positioned are configured as essentially symmetrical flow dividers.

* * * * *